(12) United States Patent
Shelander et al.

(10) Patent No.: US 8,164,886 B1
(45) Date of Patent: Apr. 24, 2012

(54) RUGGEDIZED DISPLAY ENCLOSURE

(75) Inventors: David J. Shelander, St. Paul, MN (US); Jeffrey M. Borning, Rosemount, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 257 days.

(21) Appl. No.: 12/765,211

(22) Filed: Apr. 22, 2010

(51) Int. Cl.
*G06F 1/16* (2006.01)

(52) U.S. Cl. ............... 361/679.01; 250/221; 600/549; 600/610; 428/343

(58) Field of Classification Search ............. 250/339.1, 250/339.08, 221, 385.1; 248/610, 317, 127, 248/634; 600/538, 309, 135, 549, 610; 345/175, 345/7, 107, 173, 156, 30, 167, 169; 428/138, 428/343, 213, 689; 361/679.01, 679.02, 361/679.26, 679.21, 679.22, 679.4, 679.3, 361/679.06; 359/269, 296, 290, 247
See application file for complete search history.

(56) References Cited

U.S. PATENT DOCUMENTS

| | | | |
|---|---|---|---|
| 7,619,881 B1 * | 11/2009 | Granville et al. | 361/679.21 |
| 2005/0162583 A1 * | 7/2005 | Ozolins et al. | 349/58 |
| 2008/0129647 A1 * | 6/2008 | Canova | 345/1.1 |
| 2011/0019363 A1 * | 1/2011 | Vahlsing et al. | 361/695 |

OTHER PUBLICATIONS

"Military Displays Quick Selection Chart," by Aydin Displays, Inc., located at http://aydindisplays.com/categories.php?category=Military-Displays, 2010, 1 page.

"Display Monitors: Rugged Displays," by Barco, located at http://www.barco.com/en/productcategory/20, 1 page, printed from the internet on Aug. 13, 2010.

* cited by examiner

*Primary Examiner* — Hung Duong
(74) *Attorney, Agent, or Firm* — Hamre, Schumann, Mueller & Larson, P.C.

(57) ABSTRACT

A ruggedized display enclosure is described that houses an electronic display while withstanding severe shock and vibration, as well as environmental drip, such as for example conditions encountered in military environments. The ruggedized display enclosure has a cover structure to house the electronic display, but also allows the electronic display to be seen through the cover structure, so that the electronic display is usable when inside the enclosure. A damping material is arranged on outer areas of such an electronic display, between the electronic display and the cover structure. The damping material is arranged to allow the electronic display to be suspended with respect to the cover structure, thereby protecting the electronic display against conditions of shock and vibration.

20 Claims, 5 Drawing Sheets

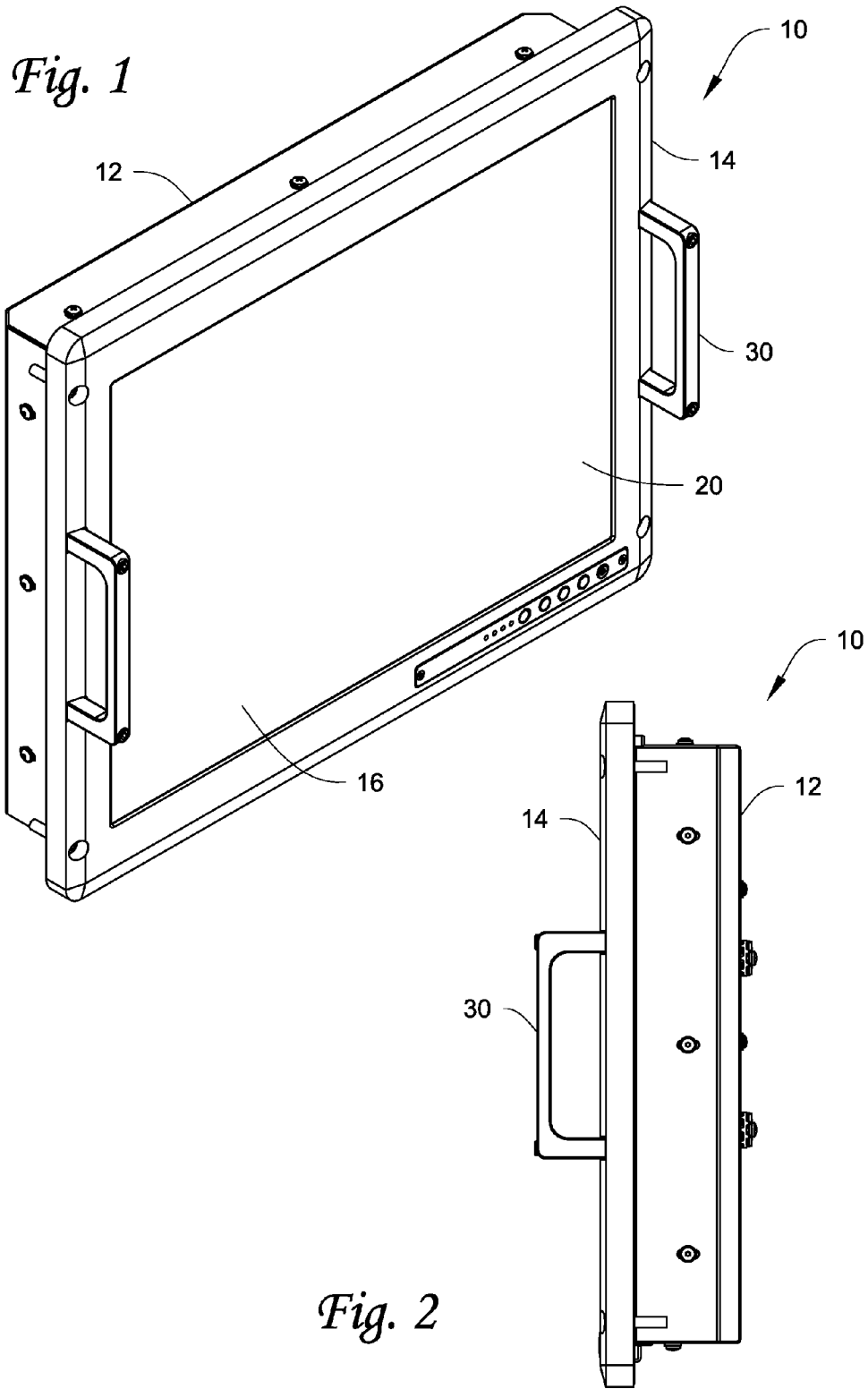

RUGGEDIZED DISPLAY ENCLOSURE

FIELD

A ruggedized display enclosure for housing an electronic display is described that can withstand severe shock and vibration, as well as environmental drip, such as for example conditions encountered in military environments. Particularly, a ruggedized display enclosure is described that has a housing to cover an electronic display and a damping material arranged on outer areas of an electronic display. The damping material provides an isolation structure that allows such an electronic display to be suspended within the housing, and the housing allows the electronic display to be used when inside the enclosure.

BACKGROUND

Ruggedization of electronic equipment has been important where such equipment is used in harsh environments, including for example conditions of high shock and vibration and environmental drip. Ruggedized equipment has included, for example electronic displays, such as monitors that may be liquid crystal displays (LCDs), plasma displays, light emitting diode displays (LEDs), or the like. Harsh environments include, for example, conditions of high shock and vibration and environmental drip. Such conditions potentially are encountered, for example, in military environments where, in some cases, certain standards have been determined in order to make such equipment ruggedized meet military specifications, such as for example naval and airborne requirements.

Ruggedized displays have been known and produced by several display vendors. However, such existing designs are hard mounted, often using stiffeners to further assist in providing shock and vibration protection. Such existing products are very stiff and have mount structures with tight tolerances and specifications, resulting in products that typically cost in the range of 10,000-15,000 dollars.

Despite the existing technology, there remains a need to provide alternatives to ruggedizing electronic displays that meet necessary ruggedization requirements, but also that significantly reduce costs and that provide ease of assembly.

SUMMARY

The following describes an improved ruggedized display that has damping material to isolate and protect an electrical display from harsh environments, including for example conditions of intense shock and vibration. An improved method of assembling the ruggedized display enclosure with an electronic display is also described.

Generally, the ruggedized display enclosure has a cover structure for an electronic display that allows the display to be used when assembled with the enclosure. Protection from shock and vibration is provided by a damping material used as an isolation structure to suspend the electronic display with respect to the cover structure.

Where appropriate, the ruggedized display enclosure includes one or more seals on the cover structure to provide electromagnetic interference shielding and protection from environmental drip.

As to an electronic display, the ruggedized display enclosure described herein may be assembled with various types of electronic displays, which include for example but are not limited to monitors, and include but not limited to liquid crystal displays (LCDs), plasma displays, light emitting diode displays (LEDs), or the like. Various types of electronic displays which may be assembled with the ruggedized display enclosure include those produced by various manufacturers worldwide, and include such displays produced and available as commercial off the shelf displays.

As to harsh environments, the ruggedized display enclosure described herein may provide protection from intense conditions, for example, conditions of high shock and vibration and environmental drip, where such conditions potentially are encountered, for instance, in military environments including naval and airborne platforms.

Generally, one embodiment of a ruggedized display enclosure includes a housing and damping material. The housing is constructed to cover an electronic display. The housing has an area of transparent material that allows a viewing area of the electronic display to be seen through the housing. The damping material is contactable with outer surfaces of the electronic display without blocking the viewing area of the electronic display. The damping material is configured to be arranged within the housing but outside of the electronic display, and is configured to be arranged so as to suspend the electronic display with respect to the housing.

In some embodiments, the damping material is an elastomeric material that can provide both spring constant and damping properties.

In some embodiments, the ruggedized display enclosure may be provided as a kit that is to be assembled with an electronic display.

In some embodiments, the ruggedized display enclosure includes at least one bracket that covers a portion of the damping material. The bracket is arranged between the damping material and the housing to allow ease of assembly.

In some embodiments, the ruggedized display comprises at least one adjustable bracket, the at least one adjustable bracket allows accommodation of electronic displays having different thicknesses.

Generally, a ruggedized display assembled together with an electronic display in one embodiment includes the following: an electronic display having a viewing area; a housing that has a back cover and a front cover; and a damping material. The back cover and the front cover are constructed to house the electronic display. The front cover has an area of transparent material that allows the viewing area to be seen through the front cover. The damping material contacts outer surfaces of the electronic display without blocking the viewing area. The damping material is configured to be arranged within the housing and outside the electronic display, and is configured to be arranged so as to suspend the electronic display with respect to the housing.

Generally, a method for assembling a ruggedized display in one embodiment includes placing a damping material on an electronic display and covering the electronic display with a housing after the damping material is placed on the electronic display. The step of placing the damping material includes: putting the damping material on outer surfaces of the electronic display without blocking a viewing area of the electronic display; arranging the damping material so that, after assembly, the damping material is within the housing and outside the electronic display; and arranging the damping material so that the electronic display is suspended with respect to the housing. The step of covering the electronic display includes allowing a viewing area of the electronic display to be seen through the housing, such that the display is ready for use after assembly.

BRIEF DESCRIPTION OF THE DRAWINGS

FIG. 1 is a front isometric view of one embodiment of a ruggedized display enclosure assembled with a display.

FIG. 2 is a side view of the ruggedized display enclosure of FIG. 1.

DETAILED DESCRIPTION

Figure 3:
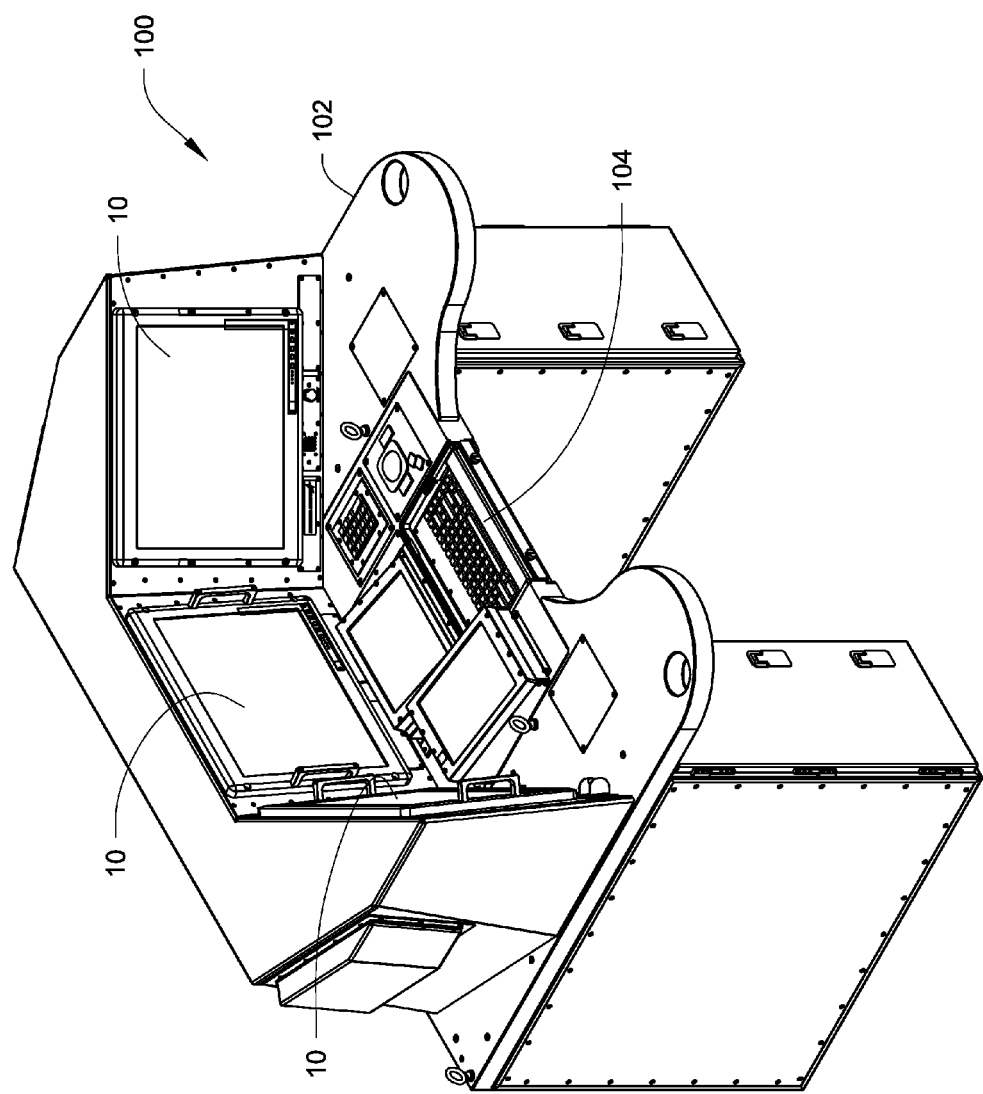
FIG. 3 is a view showing the ruggedized display enclosure of FIG. 1 assembled with a display that is mounted in a console.

An improved ruggedized display enclosure and method of assembling the enclosure with an electronic display is described. Generally, the ruggedized display enclosure has a cover structure for an electronic display that allows the display to be used when assembled with the ruggedized display enclosure. A damping material is provided to protect an electrical display from harsh environments, including for example conditions of intense shock and vibration. The damping material provides a suspension or isolation system for an electronic display assembled within the ruggedized display enclosure. Where appropriate, further seal components may be employed to provide protection against environmental drip and electromagnetic interference.

Turning to FIGS. 1-6, an embodiment of a ruggedized display enclosure 10 is shown. In the embodiment shown, the ruggedized display enclosure 10 has a housing made of a back cover 12 and a front cover 14. See e.g. FIGS. 1 and 2. As shown, the back cover 12 and the front cover 14 are connectable to each other to cover an electronic display 16. The ruggedized display enclosure 10 also includes a damping material 34, which is arranged to provide suspension and isolation of the electronic display 16 when it is assembled within the ruggedized display enclosure 10. The damping material 34 is described in further detail below with respect to FIGS. 4 and 6.

With reference to the term "electronic display", the ruggedized display enclosure 10 described herein may be assembled with various types of electronic displays, which include for example but are not limited to monitors, and which include but are not limited to liquid crystal displays (LCDs), plasma displays, light emitting diode displays (LEDs), or the like. Various types of electronic displays which may be assembled with the ruggedized display enclosure 10 also include such displays produced by various manufacturers worldwide, and including but not limited to those displays produced and available as commercial off the shelf products. When a commercial off the shelf product is used, the display can be stripped down essentially to the display component and function, such as the glass assembly, and its electrical components and circuit cards.

In some embodiments, the ruggedized display enclosure 10 may be provided as a kit that is to be assembled with the electronic display 16.

With reference to "harsh environments", the ruggedized display enclosure 10 described herein may provide protection from intense conditions, for example, conditions of high shock and vibration, electromagnetic interference (EMI), and environmental drip, such as water drip, condensation, and humidity, where such conditions may occur over a range of temperatures of about −60° C. to about 125° C., and where such conditions potentially are encountered, for instance, in military environments including naval and airborne platforms. The ruggedized display enclosure 10 is meant to withstand such conditions, so as to protect the physical structures of an electronic display (e.g. 16) that are housed inside the enclosure 10, as well as the display's electrical components.

In some instances, whenever appropriate, the ruggedized display enclosure 10 herein, including for example its housing and damping material, and any additional seal components that may be employed, may be constructed and arranged so as to meet various military specifications as desired and/or needed. For example, the ruggedized display enclosure 10 herein can be constructed and arranged to meet naval specifications, including but not limited to MIL-S-901D Grade A shock and MIL-STD-167 vibration standards as well as airborne military specifications, such as but not limited to MIL-STD-810, and can withstand frequencies in the range of at least 4-500 Hz It will be appreciated that the ruggedized display enclosure 10 herein may be suitable for other uses that may not include military uses, but where there is a general need for a ruggedized display enclosure to protect an electronic display from certain levels of shock, vibration, environmental drip, EMI, temperature, and the like.

With reference to the housing, the back cover 12 and the front cover 14 make up the housing and are connectable to each other. In one embodiment, the covers 12, 14 are rigid structures, and are for example constructed of a metal material. In the example shown, the back cover 12 and front cover 14 respectively have holes 40, 42, such as for bolt or screw structures to be inserted and fastened to connect the covers 12, 14. It will be appreciated that the manner in which the covers 12, 14 are connected is not limited to the specific fastener structures shown and may be achieved in other ways.

Figure 5:
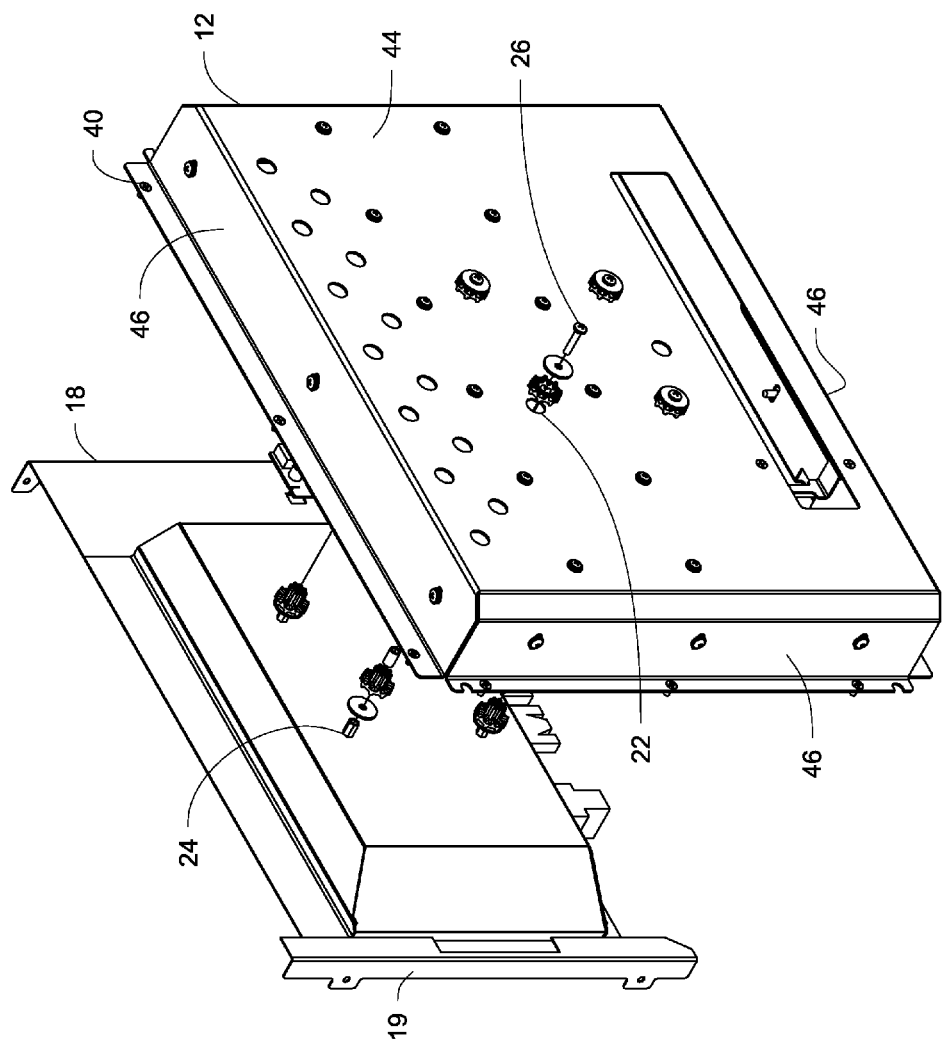
FIG. 5 is rear exploded isometric view of part of the ruggedized display enclosure showing one embodiment of a rear cover and an additional housing component for mounting one or more circuit cards.
Figure 6:
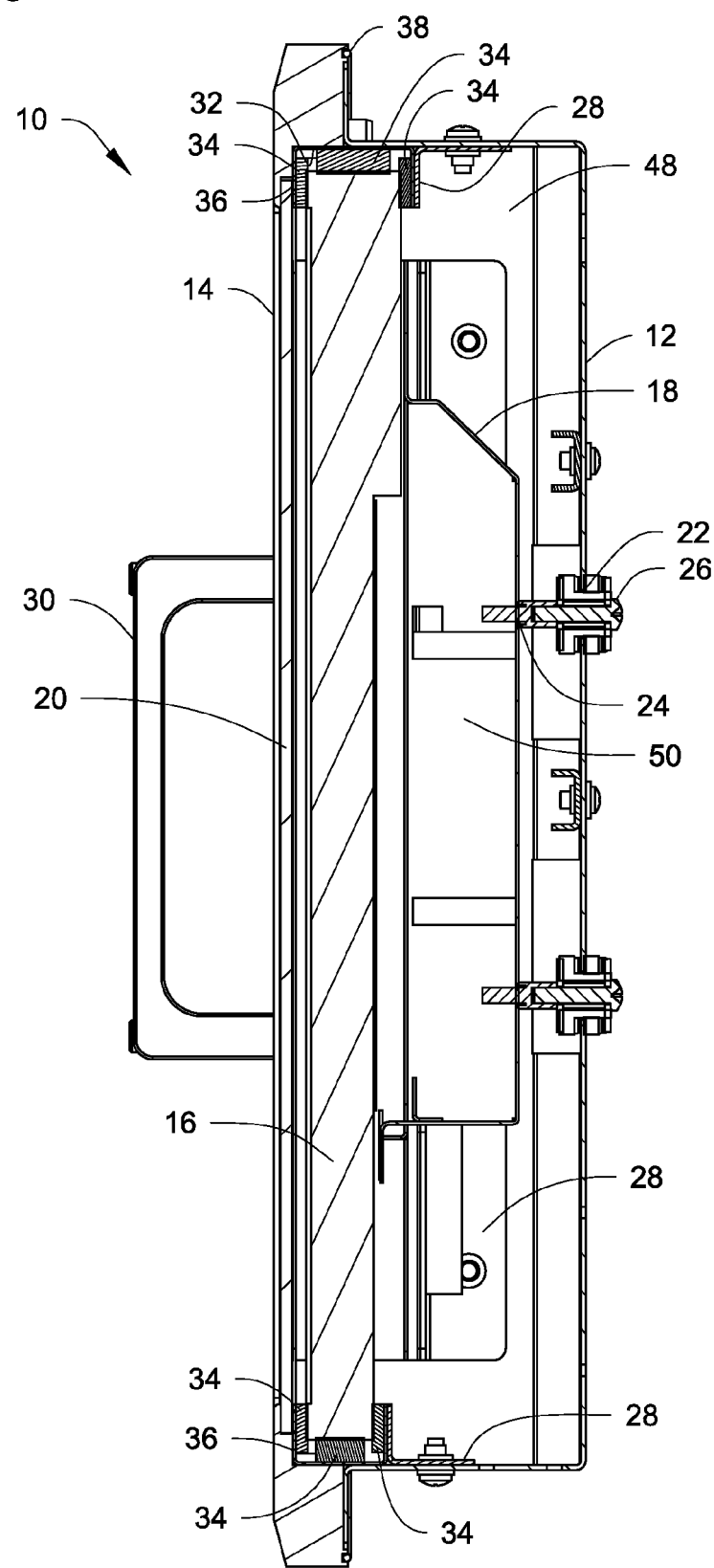
FIG. 6 is a side sectional view of the ruggedized display enclosure of FIG. 1 assembled with a display.

With reference to the back cover 12, FIG. 5 shows the back cover 12. In the embodiment shown, the back cover 12 is generally a rectangular structure which can accommodate most electronic displays and can be sized as needed to accommodate an electronic display. The back cover 12 has a back wall 44 and four side walls 46 extending generally perpendicular from the back wall 44. The four side walls 46 represent bottom, top, and right and left sides of the back cover 12. In FIG. 5, the top and left sides of the sidewalls 46 are shown, for instance if the back cover 12 is viewed from the perspective of the front side opposite the back wall 44. It will be appreciated that the bottom and right sides are respectively the same as the top and left sides shown in FIG. 5. As best shown in FIG. 6, the back wall 44 and side walls 46 are constructed to provide a space 48 inside the back cover 12, such as for example to house certain card set and electrical components that may be part of the display 16.

In some instances, the space 48 can accommodate a display 16 that may also include an additional rear housing 18. With further reference to FIG. 5, an example of an additional rear housing 18 is shown (not connected to the display 16). The rear housing 18 is configured to mount one or more circuit cards of the electronic display 16. In the embodiment shown, the rear housing 18 can be contained inside space 48 within the configuration of the back wall 44 and side walls 46. The rear housing 18 has its own space 50 (see FIG. 6) to allow electrical components of the electronic display 16, such as circuit cards to be housed and set. While the rear housing 18 is not shown connected to the display 16, it will be appreciated that when a rear housing 18 is present, it may be configured as a part of the display 16 and can be connected to the display 16 in a variety of ways. In the embodiment shown, for example, brackets 19 are used to retain the rear housing 18 to the display 16. For example, the brackets 19 are side brackets that are configured to connect to the side of the display 16.

In the embodiment shown, the rear housing 18 can connect to the back cover 12. In one embodiment, the rear housing 18 connects to the back wall 44, such as for example through a screw assembly 26 through respective holes 22, 24. It will be appreciated that the manner in which the rear housing 18 is connected to the back wall 44 is not limited to the specific fastening structures shown and may be achieved in a variety of ways. It will also be appreciated that the rear housing 18 may be part of the back cover, rather than the display 16, and can be constructed so that it is built or formed as one piece within the configuration of the back wall 44 and sidewalls 46.

With further reference to the front cover 14, the front cover 14 is generally a rectangular structure which can accommodate most electronic displays and can be sized as needed to accommodate an electronic display. The front cover 14 has an area of transparent material 20 that allows a viewing area of the electronic display 16 to be seen through the housing. The area of transparent material 20 helps to allow the electronic display 16 to be used when it is inside and protected by the ruggedized display enclosure 10. As shown in FIG. 3, for example, the ruggedized display enclosure 10 when assembled with the electronic display 16 can be mounted on a console 100 and be ready for use. In some embodiments, the console may be any suitable workstation 102 with a control area 104. It will be appreciated that the ruggedized display enclosure 10 can be constructed and assembled with an electronic display 16 so as to fit within an allowed space that the display 16 is to be used. As shown, more than one (e.g. three) ruggedized display enclosures 10 (with electronic displays inside) are mounted on the console 100. It will be appreciated that more or less than three ruggedized display enclosure assemblies may be employed for a single console.

With further reference to the area of transparent material 20, the material 20 in some embodiments is a polycarbonate layer, or other suitable optically transparent thermoplastic polymer, or if appropriate a glass layer. Where appropriate, the material 20 may be constructed with a coating of conductive metal film that is optically transparent. In some embodiments, the coating is a very thin film that is optically transparent, for example 2-5 micro-inches of thickness. Such a coating, when used, is helpful to provide electromagnetic interference (EMI) shielding and protection, while allowing optical transmission and visibility of the display 16. It will be appreciated that the thickness of the film can be modified as needed or desired.

In appropriate circumstances, the front cover 14 includes additional seals to assist with EMI shielding and environmental drip. In the example shown in FIG. 4, an additional seal 38 can provide EMI shielding and/or environmental drip. The seal 38 is proximate the outer perimeter of the front cover 14. As shown, seal 38 is on one side of the front cover 14, for example the side that would mount into a console (e.g. console 100) or the side that faces toward the back cover 12 or electronic display 16 when assembled. In one embodiment, the seal 38 is a gasket seal disposed proximate the outer perimeter of the front cover 14. It will be appreciated that other arrangements of the seal 38 may be employed as needed to provide any necessary EMI shielding and environmental drip protection. It also will be appreciated that additional EMI and/or environment drip seals may be placed on any part of the front cover 14, back cover 12, electronic display 16, wherever such protection is needed.

Figure 4:
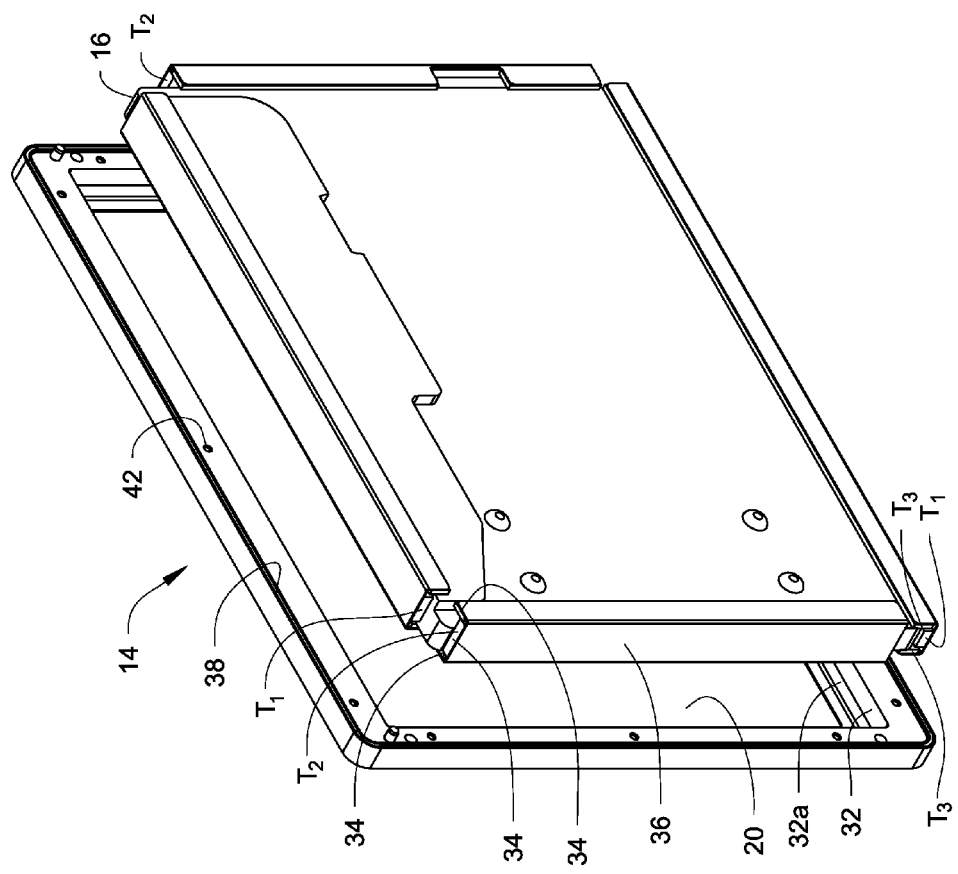
FIG. 4 is rear exploded isometric view of part of the ruggedized display enclosure of FIG. 1, showing an embodiment of a front cover and an arrangement of damping material assembled with respect to a display.

As shown in FIG. 4, a recess 32 is on an inner side of the front cover 14 or the side facing the electronic display 16. The recess 32 is located a distance from the perimeter of the outer part of the front cover 14, and extends about the perimeter of the front cover 14. The recess 32 allows a lip structure of the front cover 14 for the electronic display 16 and damping material structure thereon to fit within the boundary of the recess 32.

In some cases, an environmental drip and EMI gasket can be placed between the area of transparent material 20 and the front cover 14. For example, such a gasket (not shown) may be disposed between the front cover 14 at a surface 32*a* of the recess 32 and the area of transparent material 20. In some embodiments, the surface 32*a* is present around the perimeter of the backside of the front cover 14, as a result of the structure provided by the recess 32 (surface 32*a* not fully shown in the isometric view of FIG. 4). An environmental drip and/or EMI seal may be disposed on the surface 32*a* to seal the display 16 from the front of the enclosure. It will be appreciated that such a gasket would not obscure or would at least minimize obscuring the view of the display 16. In some embodiments, such a gasket may be two separate gaskets, one for environmental drip and one for EMI shielding, or may be a single gasket which provides both protections, such as for example a conductive elastomeric gasket.

The front cover 14 also includes handles 30. In the example shown, the handles 30 are positioned on a side of the front cover 14, for example, the exposed side. The handles 30 help to allow mounting and removal of the enclosure and display assembly.

With further reference to the damping material 34, FIGS. 4 and 6 show one embodiment of a configuration as to how the damping material 34 is arranged with respect to the electronic display 16 and covers 12, 14.

Generally, the damping material 34 is contactable with outer surfaces of the electronic display 16 without blocking the viewing area of the electronic display 16 through the area of transparent material 20. The damping material 34 is configured to be arranged within the housing of covers 12, 14, but outside of the electronic display 16. The damping material 34 is configured to be arranged so as to suspend or isolate the electronic display 16 with respect to the housing. In some embodiments, the damping material 34 is an elastomeric material.

For example, the electronic display 16, when assembled inside the enclosure 10, is protected by the damping material 34 on a portion of all sides so as to provide suspension in all degrees of freedom. For example, all six degrees of freedom can be accounted for by the arrangement and suspension support of the isolation structure of the damping material 34. Here, the term "six degrees of freedom" refers to motion of the electronic display 16 in three-dimensional space, namely the ability of the display 16 to move forward/backward, up/down, left/right (translation in three perpendicular axes), combined with rotation about three perpendicular axes (pitch, yaw, roll). The damping material 34 protects the display 16 if moved in any of these degrees of freedom, and provides suspension support so that the display is "floating" within housing.

With reference to the damping material arrangement, the damping material 34 in the example shown is a layer disposed on the outer surfaces of the electronic display 16. The outer surfaces include portions of the top, bottom, side, front and back surfaces. It will be appreciated that the damping material 34 can be arranged in a variety of ways so as to accomplish a suspension protection at all degrees of freedom. Depending on factors such as but not limited to the dimensions and weight of the display 16, the damping material 34 can be arranged accordingly to provide a spring constant that is needed or desired. With reference to spring constant, a spring constant and damping coefficient may be selected so that the natural frequency, e.g. threshold of excitement, is low enough to provide equipment protection but not so low that viewability of the display is compromised. For example, in certain situations where the spring constant and damping coefficient are too low, the potential displacement of the display may be too high so that it is not possible to read the display during use.

When the display 16 has an additional rear housing, such as rear housing 18, the damping material 34 can be arranged as appropriate such that it is disposed on outer surfaces of the rear housing 18 as needed. For example, the damping material 34 can be arranged and positioned on outer surfaces of the brackets 19 of the rear housing 18. It will be appreciated that the descriptions herein with respect to the damping material 34 being arranged on outer surfaces of the display 16 can also apply to outer surfaces of the brackets 19 where appropriate. For example, the damping material 34 (and brackets 36 further described below) as shown in FIG. 4 on the right and left sides of the display 16 can be arranged on the outer surface of the brackets 19, rather than directly onto the right and left sides of the glass assembly of the display 16.

In one embodiment, it is desired to design and arrange the damping material 34 so that the load of the display 16 is as evenly distributed as possible along the highest possible area. For example, the damping material 34 is one or more layers disposed on a majority portion of each of the top, bottom, and side surfaces, and disposed on a minor portion of the front and back surfaces of the display 16. In the example shown by FIGS. 4 and 6, for instance, the damping material 34 is on a major part of the top, bottom and left and right side surfaces of the electronic display 16. The damping material 34 is on minor portions of the back and front sides of the display 16.

In other instances whenever appropriate and/or desired, it will be appreciated that the damping material 34 could be continuously disposed along the top, bottom, and right and left sides of the display 16, or in other instances broken up into separate pieces of damping material along these sides. Likewise, the front and back sides of the display 16 may also have a continuous layer or broken layer of damping material 34, such as but limited to, a strip (or strips) arranged along the perimeter such as shown in FIG. 4. In other examples, the damping material 34 may be arranged to and/or be included around the corners of the display 16 (not shown).

With further reference to FIG. 4, the layer of damping material 34 can be arranged at different thicknesses on the display 16. In one example, the damping material 34 has a thickness $T_1$ at the bottom and top surfaces that is greater than a thickness at the right and left side surfaces, as well as the front and back surfaces. Also, the damping material 34 can have a thickness $T_2$ at the right and left side surfaces that is greater than a thickness $T_3$ at the front and back surfaces but less than thickness $T_1$. Due to the nature of shock and vibration energy that may be encountered, it sometimes may be desirable and/or needed to have a higher thickness of damping material 34 at areas where higher energy may be endured, for example the top and bottom as opposed to the right and left sides, and likewise the right and left sides as opposed to the front and back. It will be appreciated that the relative thicknesses can vary as needed and/or desired, and the relative thicknesses are not limited to those shown in FIGS. 4 and 6.

As shown in the FIG. 6, for example, the damping material 34 may be arranged or formed as multiple u-shaped portions on the electronic display 16. See for example the top and bottom of the display 16 in FIG. 6.

As described, the damping material 34 may be an elastomeric material. It will be appreciated that the manner in which the damping material 34 is put in position can be accomplished in a variety ways. By way of non-limitative examples, the damping material 34 is already molded or formed pieces that are placed into position with respect to the display 16 and the back and front covers 12, 14. In some embodiments, a pressure sensitive adhesive may be used to place the pieces of damping material 34 into position. In other instances, when appropriate, the damping material 34 can be injection molded into place.

With further reference to FIGS. 4 and 6, in some embodiments, the ruggedized display enclosure 10 includes at least one bracket 36 that covers a portion of the damping material 34. The bracket 36 is arranged between the damping material 34 and the housing (see e.g. FIG. 6). As shown in FIG. 4, a bracket 36 is included at each side of the display 16 and covers each u-shape of the damping material 34 arrangement. In the embodiment shown, the brackets 36 also are u-shaped. The brackets 36 help to provide ease of assembly, for example when the display 16 and damping material are put inside the front and back covers 12, 14. The brackets 36 provide a shoehorn like feature that can also help protect the damping material 34 from unwanted pinching, peeling, or distortion during assembly. In some embodiments, the bracket 36 is constructed of metal and provides ease of assembly with the metal covers 12, 14.

In some embodiments, the ruggedized display enclosure 10 includes a way to accommodate various thicknesses of electronic displays. In the embodiment shown, the ruggedized display enclosure 10 includes at least one adjustable bracket 28 on the back cover 12. The adjustable bracket 28 is adjustable, for example, in a depthwise direction with respect to the back cover 12. As shown, the bracket 28 is held in place, for example by a screw or any suitable fastener. The fastener can be loosened to allow movement of the bracket 28 to and from the back wall 44 so as to adjust for varying thickness of a particular electronic display to be housed inside the enclosure 10. The adjustable bracket 28 also helps with holding the electronic display 16 in place when the back and front covers 12, 14 are put together.

Generally, the ruggedized display enclosure 10 and electronic display 16 can be assembled by placing a damping material 34 on the electronic display 16 and covering the electronic display with the back and front covers 12, 14. In one embodiment, the covers 12, 14 are applied after the damping material 34 is placed on the electronic display 16. Placing the damping material 34 includes putting the damping material 34 on outer surfaces of the electronic display 16 without blocking its viewing area, such as according to the arrangement shown in FIGS. 4 and 6. Arrangement of the damping material 34 is such that, after assembly, the damping material 34 is within the housing and outside the electronic display 16, and such that the electronic display 16 is suspended or isolated with respect to the covers 12, 14. Covering the electronic display 16 includes putting the display 16 inside the covers 12, 14 and connecting the covers 12, 14, while allowing the viewing area of the electronic display 16 to be seen through the front cover. In this manner, the display 16 is ready for use after it is assembled. In some instances, the time for assembly is about one hour. The assembled enclosure 10 and display 16 can then be mounted to a console (e.g. console 100 of FIG. 3) or location where it is to be used.

The invention may be embodied in other forms without departing from the spirit or novel characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

We claim:

1. A ruggedized display comprising:
an electronic display that has a viewing area;
a housing that has a back cover and a front cover; and
a damping material,
the back cover and the front cover are constructed to house the electronic display, where the front cover has an area of transparent material that allows the viewing area to be seen through the front cover,
the damping material contacts outer surfaces of the electronic display without blocking the viewing area, the damping material is configured to be arranged within the housing and outside the electronic display, and is configured to be arranged so as to suspend the electronic display with respect to the housing.

2. The ruggedized display of claim 1, wherein the electronic display is a commercial off the shelf electronic display.

3. The ruggedized display of claim 1, wherein the back cover is configured to house a circuit card of the electronic display, the back cover and front cover are configured to allow mounting on a console.

4. The ruggedized display of claim 1, wherein the area of transparent material of the front cover is a polycarbonate layer.

5. The ruggedized display of claim 4, wherein the polycarbonate layer includes a coating of conductive metal film that is optically transparent.

6. The ruggedized display of claim 1, wherein the damping material is a layer disposed on the outer surfaces of the electronic display, the outer surfaces include portions of the top, bottom, side, front and back surfaces.

7. The ruggedized display of claim 6, wherein the layer is disposed on a majority portion of each of the top, bottom, and side surfaces, and disposed on a minor portion of the front and back surfaces.

8. The ruggedized display of claim 6, wherein the layer has a thickness that is greater at the bottom and top surfaces, than at the side, front and back surfaces, and has a thickness that is greater at the side surfaces than at the front and back surfaces.

9. The ruggedized display of claim 1, wherein the damping material is arranged as multiple u-shaped portions on the electronic display.

10. The ruggedized display of claim 1, wherein the damping material is an elastomeric material.

11. The ruggedized display of claim 1, further comprising at least one bracket that covers a portion of the damping material, so as to be arranged between the damping material and the housing.

12. The ruggedized display of claim 11, wherein the bracket is u-shaped.

13. The ruggedized display of claim 1, wherein the back cover further comprises at least one adjustable bracket, the at least one adjustable bracket is adjustable in a depthwise direction with respect to the back cover.

14. The ruggedized display of claim 1, wherein the front cover includes a seal that provides electromagnetic interference shielding.

15. A ruggedized display enclosure kit for an electronic display comprising:
a housing; and
damping material,
the housing includes a back cover and a front cover, the back cover and the front cover are constructed to house an electronic display, where the front cover has an area of transparent material that allows a viewing area of the electronic display to be seen through the front cover,
the damping material is contactable with outer surfaces of the electronic display without blocking the viewing area of the electronic display, the damping material is configured to be arranged within the housing but outside of the electronic display, and is configured to be arranged so as to suspend the electronic display with respect to the housing.

16. The ruggedized display enclosure kit of claim 15, wherein the back cover is configured to house a circuit card.

17. The ruggedized display enclosure kit of claim 15, wherein the area of transparent material of the front cover is a polycarbonate layer, the polycarbonate layer includes a coating of conductive metal film that is optically transparent, and the front cover includes a seal, where the coating and seal provide electromagnetic interference shielding.

18. The ruggedized display enclosure kit of claim 15, wherein the damping material is an elastomeric material formed as multiple u-shaped portions, and further comprising at least one bracket that surrounds the damping material, so as to be arranged between the damping material and the housing, and the at least one bracket is u-shaped.

19. The ruggedized display enclosure assembly of claim 15, wherein the back cover further comprises at least one adjustable bracket, the at least one adjustable bracket is adjustable in a depthwise direction with respect to the back cover.

20. A method for assembling a ruggedized display comprising:
placing a damping material on an electronic display; and
covering the electronic display with a housing after the damping material is placed on the electronic display,
wherein the step of placing the damping material includes putting the damping material on outer surfaces of the electronic display without blocking a viewing area of the electronic display, and arranging the damping material so that, after assembly, the damping material is within the housing and outside the electronic display, and arranging the damping material so that the electronic display is suspended with respect to the housing, and
wherein the step of covering the electronic display includes allowing a viewing area of the electronic display to be seen through the housing, such that the display is ready for use after assembly.

* * * * *